US012366552B2

(12) United States Patent
Gamache (10) Patent No.: US 12,366,552 B2
(45) Date of Patent: Jul. 22, 2025

(54) PHOTOIONIZATION DETECTOR AND METHOD FOR GAS SAMPLE ANALYSIS

(71) Applicant: Mécanique Analytique Inc., Thetford Mines (CA)

(72) Inventor: Yves Gamache, Thetford Mines (CA)

(73) Assignee: Mécanique Analytique Inc., Thetford Mines (CA)

( * ) Notice: Subject to any disclaimer, the term of this patent is extended or adjusted under 35 U.S.C. 154(b) by 260 days.

(21) Appl. No.: 17/920,487

(22) PCT Filed: Apr. 22, 2021

(86) PCT No.: PCT/CA2021/050553
§ 371 (c)(1),
(2) Date: Oct. 21, 2022

(87) PCT Pub. No.: WO2021/212229
PCT Pub. Date: Oct. 28, 2021

(65) Prior Publication Data
US 2023/0145929 A1 May 11, 2023

Related U.S. Application Data

(60) Provisional application No. 63/015,125, filed on Apr. 24, 2020.

(51) Int. Cl.
*G01N 27/64* (2006.01)
(52) U.S. Cl.
CPC .................... *G01N 27/64* (2013.01)
(58) Field of Classification Search
CPC ...... G01N 27/64; G01N 27/62; G01N 27/626; G01N 27/622; G01N 27/68; G01N 21/714;
(Continued)

(56) References Cited

U.S. PATENT DOCUMENTS

| 3,653,185 A | 4/1972 | Scott et al. |
| 4,070,580 A | 1/1978 | Gallagher et al. |

(Continued)

FOREIGN PATENT DOCUMENTS

| CN | 107917951 A | 4/2018 |
| EP | 1059530 A2 | 12/2000 |

(Continued)

OTHER PUBLICATIONS

International Search Report and Written Opinion issued in International Application No. PCT/CA2021/050553, dated Jul. 21, 2021, 6 pages.

(Continued)

*Primary Examiner* — Son T Le
(74) *Attorney, Agent, or Firm* — Rothwell, Figg, Ernst & Manbeck, P.C.

(57) ABSTRACT

A photoionization detector (PID) is disclosed that includes an ionization chamber configured to allow a flow of a gas sample therethrough, the ionization chamber defining an ionization region and a detection region, a photoionization source configured to generate ionizing radiation for irradiating the flow of the gas sample in the ionization region, an electric-field ionization source configured to apply an ionizing electric field inside the ionization chamber to intersect the flow of the gas sample in the ionization region, the ionizing radiation and the ionizing electric field being configured to ionize the gas sample, and an ion detector configured to detect, in the detection region, an ionization current resulting from the ionized gas sample. The PID may also include an optical window, for example, made of a window material including sapphire, configured to allow at least part of the ionizing radiation to pass therethrough prior to entering the ionization region.

36 Claims, 4 Drawing Sheets

(58) Field of Classification Search
CPC ...... G01N 21/718; G01N 21/73; G01N 21/75; G01N 2030/642
See application file for complete search history.

(56) References Cited

U.S. PATENT DOCUMENTS

| | | | |
|---|---|---|---|
| 5,154,733 | A | 10/1992 | Fujii et al. |
| 5,773,833 | A * | 6/1998 | Hsi .................. G01N 27/64 250/382 |
| 7,046,012 | B2 | 5/2006 | Dean et al. |
| 9,899,197 | B2 | 2/2018 | Sanford et al. |
| 2006/0284103 | A1 | 12/2006 | Syage |
| 2014/0132277 | A1* | 5/2014 | Stearns .................. H01J 49/107 324/464 |
| 2016/0282304 | A1 | 9/2016 | Vilkov et al. |
| 2018/0059058 | A1* | 3/2018 | Fan .................. G01N 27/64 |
| 2021/0341422 | A1* | 11/2021 | Fan .................. G01N 30/463 |

FOREIGN PATENT DOCUMENTS

| | | |
|---|---|---|
| EP | 1726946 A1 | 11/2006 |
| EP | 1229995 B1 | 9/2008 |
| WO | 2006012777 A1 | 2/2006 |
| WO | 2019191849 A1 | 10/2019 |

OTHER PUBLICATIONS

Samuel O. Agbroko, et al., "A Novel, Low-Cost, Portable PID Sensor for Detection of VOC", Proceedings, vol. 1, No. 482, 2017, 4 pages.

A. K. Stober, et al. "A Vacuum Ultraviolet Photoionization Detector" NASA, Technical Note, D-1715, National Aeronautics and Space Administration, 1963, 11 pages.

J. B. M. Warntjes, et al. "Autoionizing Rydberg States of NO In Strong Electric Fields", Journal of Chemical Physics, vol. 111, No. 6, 1999, 9 pages.

Hamed Bahrami, et al., "Combined Corona Discharge and UV Photoionization Source for Ion Mobility Spectrometry", Talanta 97, Elsevier, Retrieved from Journal homepage: www.elsevier.com/locate/talanta, 2012, pp. 400-405.

Robert T. Nishida, et al., "Measuring Ultrafine Aerosols by Direct Photoionization and Charge Capture In Continuous Flow", Aerosol Science and Technology, vol. 52, No. 5, ISSN: 0278-6826, Retrieved from oneline Journal homepage: https://www.tandfonline.com/loi/uast20, 2018, pp. 546-556.

Lawrence Dunkelman, et al. "Spectrally Selective Photodetectors for the Middle and Vacuum Ultraviolet", published in Applied Optics, vol. 1, Issue 6, 1962, pp. 695-700.

C.Y. Ng, "Vaccum Ultraviolet Spectroscopy and Chemistry by Photoionization and Photoelection Methods" Annu. Rev. Phys. Chem., vol. 53, 2002, pp. 101-140.

* cited by examiner

PHOTOIONIZATION DETECTOR AND METHOD FOR GAS SAMPLE ANALYSIS

CROSS REFERENCE TO RELATED APPLICATIONS

This application is a 35 U.S.C. § 371 National Stage of International Patent Application No. PCT/CA2021/050553, filed Apr. 22, 2021, which claims priority to U.S. Provisional Patent Application No. 63/015,125, filed Apr. 24, 2020. The above-referenced patent applications are incorporated herein by reference in their entireties.

TECHNICAL FIELD

The technical field generally relates to gas detection and, more particularly, to photoionization detectors for detecting chemical compounds in a gas sample.

BACKGROUND

Various types of gas detectors and detection technologies are known in the art. Photoionization detectors (PIDs) are one type of gas detectors. PIDs are broadband detectors responsive to a large variety of organic compounds, such as volatile organic compounds (VOCs), and to some inorganic compounds. PIDs are widely used in gas chromatography (GC), as well as in various other industrial and scientific applications for monitoring, detection, and/or analysis of environmental and hazardous gases. Conventional PIDs generally include an ultraviolet (UV) radiation source, an ionization chamber optically coupled to the UV radiation source, and a pair of electrically biased collection electrodes disposed in the ionization chamber. The UV radiation source, typically a vacuum UV (VUV) lamp filled with a low-pressure noble gas, such as argon (Ar), xenon (Xe), or krypton (Kr), is configured to produce UV radiation with photon energies typically in a range from about 8.0 eV to about 12.0 eV. The UV radiation source has an optical window configured to allow UV radiation to pass therethrough and enter the ionization chamber. The optical window is commonly made of a fluoride salt crystal, such as $BaF_2$, $CaF_2$, $MgF_2$, and LiF. The ionization chamber is configured to allow a gas sample to flow therethrough. The UV radiation produced by the UV radiation source ionizes chemical compounds in the flowing gas sample whose ionization energies are equal to or less than the energy of the UV photons. This results in the removal of electrons from the chemical compounds and the formation of positively charged ions. The collection electrodes have an electric potential difference applied between them that generates an electric field inside the ionization chamber. The electric field separates the ions from the electrons, such that one electrode collects the ions, and the other electrode collects the electrons. This charge separation and collection process generate an electric current, which can be measured and analyzed to convey both quantitative and qualitative compositional information about the gas sample.

PIDs have various advantages, non-limiting examples of which include their high sensitivity, large dynamic range, versatility, ease of use, compact size, and nondestructive detection capabilities. However, they also have drawbacks and limitations. One drawback is that PIDs tend to have a limited lifetime and suffer from gradual performance degradation, especially at higher photon energies. Therefore, challenges remain in the field of PIDs in terms of extending their service life for improved performance.

SUMMARY

The present description generally relates to photoionization detectors (PIDs) and associated methods of operation for use in gas chromatography (GC) and other gas detection applications.

In accordance with an aspect, there is provided a PID including:
- an ionization chamber configured to allow a flow of a gas sample therethrough, the ionization chamber defining an ionization region and a detection region;
- a photoionization source configured to generate ionizing radiation for irradiating the flow of the gas sample in the ionization region;
- an electric-field ionization source configured to apply an ionizing electric field inside the ionization chamber to intersect the flow of the gas sample in the ionization region, wherein the ionizing radiation and the ionizing electric field are configured to ionize the gas sample into an ionized gas sample; and
- an ion detector configured to detect, in the detection region, an ionization current resulting from the ionized gas sample.

The gas sample may be any gaseous substance, including gases, vaporized liquids, and vaporized solids, known, expected, or suspected to contain analytes. The analytes of interest may include volatile organic compounds (VOCs), non-limiting examples of which include, to name a few, aromatics, alkenes, bromides and iodines, sulfides and mercaptans, organic amines, ketones, ethers, esters and acrylates, alcohols, aldehydes, alkanes, and alkyl halides.

In some embodiments, the ionization chamber includes a chamber body, a sample inlet configured to receive the gas sample into the chamber body, and a sample outlet configured to discharge the gas sample from the chamber body. The chamber body may enclose an interior volume that defines the ionization region and the detection region. The chamber body may also provide a sample flow path configured to allow the gas sample to flow successively through the ionization region and the detection region, from the sample inlet to the sample outlet.

In some embodiments, the photoionization source is configured to emit the ionizing radiation in the ultraviolet (UV) region of the electromagnetic spectrum, for example, in the vacuum UV (VUV) subregion, and more particularly in a wavelength range from about 150 nm down to about 100 nm, corresponding approximately to photon energies in a range between about 8.0 eV and about 12.0 eV. Such photon energies may allow various analytes of interest to be ionized without, or with low or negligible, accompanying ionization of typical carrier gases. While various embodiments disclosed herein use ionizing radiation lying in the UV range, some embodiments may use ionizing radiation lying in other regions of the electromagnetic spectrum, for example, the visible range.

In some embodiments, the PID includes an optical window configured to allow at least part of the ionizing radiation to pass therethrough prior to entering the ionization region of the ionization chamber. Depending on the application, the optical window may be provided as a component of either the photoionization source or the ionization chamber, or as a distinct component of the PID. The ionizing radiation generated by the photoionization source contains high-energy photons capable, either alone or together with the ionizing electric field applied by the electric-field ionization source, to ionize one or more analytes of interest in the gas sample. In some embodiments, the flow of the gas sample, the ionizing electric field, and a surface normal to the optical window are mutually perpendicular to one another. In some embodiments, the optical window is made of a window material including lithium fluoride (LiF), magnesium fluoride ($MgF_2$), calcium fluoride ($CaF_2$), barium fluoride ($BaF_2$), strontium fluoride ($SrF_2$), sodium fluoride (NaF), sapphire ($Al_2O_3$), or quartz ($SiO_2$), or a combination thereof.

In some embodiments, the photoionization source includes at least one UV lamp in optical communication with the ionization chamber. The UV lamp may include a lamp body enclosing an interior volume defining a discharge region configured to receive a discharge gas therein. The UV lamp may also include or be coupled to a lamp power supply and associated electronic circuitry configured to energize the discharge gas inside the discharge region into a plasma from which the ionizing radiation is generated. The UV lamp may further include an optical window mounted to the lamp body and configured to allow at least part of the ionizing radiation generated inside the discharge region to pass therethrough and into the ionization chamber. In some embodiments, the at least one UV lamp includes a pair of UV lamps disposed on opposite sides of the ionization chamber.

The discharge gas may be any gas or combination of gases enabling the generation of a plasma accompanied by the emission of radiation, for example, UV radiation. The energy of UV photons emitted by the gas discharge plasma may depend on the type of discharge gas used to fill the discharge region. Non-limiting examples of discharge gases include, to name a few, argon (Ar), xenon (Xe), krypton (Kr), neon (Ne), helium (He), hydrogen ($H_2$), oxygen ($O_2$), or nitrogen ($N_2$), or a combination thereof.

The optical window may be removably mounted to the lamp body. In such a case, removal of the optical window may be performed for inspection, cleaning, repair, replacement, and/or any other suitable maintenance operations. The optical window may be made of a material having a high UV transmittance in a certain spectral range. The optical window may act as a cutoff filter that determines the spectrum of the ionizing radiation produced in the discharge region that exits the UV lamp and enters into the ionization chamber to illuminate the gas sample in the ionization region. The optical window may be characterized by a high-cutoff photon energy, beyond which its transmittance drops significantly to become low or negligible from a practical standpoint. Non-limiting examples of window material include, to name a few, crystalline materials, such as lithium fluoride (LiF), magnesium fluoride ($MgF_2$), calcium fluoride ($CaF_2$), barium fluoride ($BaF_2$), strontium fluoride ($SrF_2$), sodium fluoride (NaF), sapphire ($Al_2O_3$), quartz ($SiO_2$), combinations thereof, and any suitable current or future window materials. Since different window materials have different transmittance spectra, the highest-energy photons that are transmitted into the ionization chamber may be controlled by the choice of the window material.

Depending on the application, various methods may be used for exciting the discharge gas inside the UV lamp and generate the gas discharge plasma from which UV radiation is emitted. Non-limiting examples of excitation methods include, to name a few, a continuous direct current (DC) discharge, a pulsed DC discharge, an alternating current (AC) discharge, a dielectric barrier discharge (DBD), a corona discharge, a radio frequency (RF) discharge, a microwave (MW) discharge, a hollow cathode (HC) discharge, an inductive coupled plasma (ICP) discharge, and a capacitively coupled plasma (CCP) discharge.

In some embodiments, the UV lamp may be configured to operate based on a DBD-based excitation method. In this case, the UV lamp may include a pair of discharge electrodes disposed in a spaced-apart relationship on opposite sides of the lamp body to define a discharge gap in the discharge region, and a pair of dielectric barriers disposed in the discharge gap, each dielectric barrier extending along and adjacent to a respective one of the discharge electrodes. In some embodiments, the lamp body includes a pair of opposite sidewalls that provide the pair of dielectric barriers. The lamp power supply may be configured to energize the discharge gas into the plasma by applying a discharge drive signal to the discharge electrodes to create a discharge electric field across the discharge gap, wherein the discharge electric field is configured for establishing and sustaining a plasma emitting UV radiation in the discharge region.

In some embodiments, the UV lamp includes one or more gas ports formed through the lamp body to provide gas communication between the discharge region and an exterior of the lamp body. The one or more gas ports may include a discharge gas inlet configured to receive the discharge gas into the discharge region and a discharge gas outlet configured to discharge the discharge gas from the discharge region. The discharge gas inlet and the discharge gas outlet may be configured for connection to a gas circulation system. The gas circulation system may be configured to circulate, either continuously or at intervals, a flow of the discharge gas through the discharge region, from the discharge gas inlet to the discharge gas outlet. Circulating a flow of the discharge gas inside the UV lamp during operation may be useful, for example, for removing contaminants formed during the plasma discharge and/or for removing heat from the UV lamp. The gas circulation system may be configured to enable selection between different types of gases and gas mixtures, which may include dopant gases, for use as the discharge gas in the UV lamp.

In some embodiments, the PID may include an optical window made of a window material whose highest-energy transmitted photons are less energetic than those of common fluoride crystal materials, such as $CaF_2$, $MgF_2$, and LiF, while allowing the detection of analytes over a comparable broad range of ionization energies. This is because the ionization of the gas sample may be achieved by the combined action of the ionizing radiation produced by the photoionization source and the ionizing electric field applied by the electric-field ionization source. For example, the optical window may be composed of sapphire, which exhibits high mechanical strength, high chemical resistance, and high thermal stability. However, the high-cutoff photon energy of sapphire is less than those of $CaF_2$, $MgF_2$, and LiF. By using field-assisted photoionization, the PID may benefit from the enhanced robustness and durability of sapphire optical windows compared to those of common fluoride crystal windows, but without, or with less of, the limitation of a reduced range of detectable analytes caused by the lower photon energies emitted by the sapphire UV lamp.

In some embodiments, the electric-field ionization source may include a pair of ionization electrodes arranged with respect to the ionization region, for example, in a spaced-apart relationship outside and on opposite sides of the ionization chamber. The electric-field ionization source may also include or be coupled to an ionization power supply and associated electronic circuitry configured to apply an ionization drive signal to the ionization electrodes to generate the ionizing electric field in the ionization region. In some embodiments, the ionization drive signal may be a DC signal, which may be a continuous DC signal or a pulsed DC signal. In particular, the DC signal may be of constant magnitude or may vary with time, either abruptly or gradually, so that various types of DC waveforms are possible, including fully and partially rectified waveforms. In other embodiments, the ionization drive signal used for generating the ionizing electric field may be a low-strength and/or low-frequency AC signal. In some embodiments, the ionization power supply may be configured to control a magnitude of the ionizing electric field to increase an upper limit of a range of ionization energies of detectable analytes in the gas sample by an amount ranging from about 1 eV to about 4 eV.

In some embodiments, the use of field-assisted photoionization may allow embodiments of PIDs disclosed herein to employ more durable yet lower-energy UV lamps, such as UV lamps with sapphire windows, but to respond to compounds with a range of ionization energies that is comparable to the range offered by higher-energy UV lamps, such as those based on $CaF_2$, $MgF_2$, LiF, and other fluoride crystals.

In some embodiments, the strength of the ionizing electric field may be varied, either during operation or between operations, to adjust the selectivity of the PID in terms of the range of ionization energies of the detectable analytes, with the selectivity generally varying inversely with electric field strength.

In some embodiments, the ion detector may include a pair of detection electrodes arranged with respect to the detection region, for example, in a spaced-apart relationship outside and on opposite sides of the ionization chamber. The ion detector may also include or be coupled to a detection power supply and associated electronic circuitry configured to establish and maintain a bias voltage between the detection electrodes to generate a detection electric field in the detection region. The detection electric field is configured to deflect and separate ions and electrons in the ionized gas sample onto respective ones of the detection electrodes for collection by the detection electrodes. The ion detector may further include a detection circuit configured to measure the ionization current based on the ions and electrons collected by the detection electrodes and to output a detection signal representative of the measured ionization current.

In some embodiments, the PID may include a control and processing unit. The control and processing unit may be configured to control, monitor, and/or coordinate the functions and operations of various components of the PID, such as the ionization chamber, the photoionization source, the electric-field ionization source, and the ion detector. The control and processing unit may also be configured to receive, from the ion detector, a detection signal representative of the ionization current, and determine, from the detection signal, analyte information about an analyte in the gas sample. The analyte information may be determined based on calibration to known standard gases. The analyte information may be a presence or absence of the analyte in the gas sample, or an amount of the analyte in the gas sample, or both. The control and processing unit may include a processor and a memory.

In accordance with another aspect, there is provided a PID including:
  an ionization chamber configured to receive a gas sample, the ionization chamber defining an ionization region and a detection region;
  a UV radiation source configured to generate UV radiation, the UV radiation source including an optical window configured to transmit at least part of the UV radiation into the ionization chamber to irradiate the gas sample in the ionization region, wherein the optical window is made of a window material including sapphire ($Al_2O_3$);
  an electric-field ionization source configured to apply an ionizing electric field to the gas sample in the ionization region, wherein the ionizing electric field is configured to combine with the transmitted UV radiation to ionize the gas sample into an ionized gas sample; and
  an ion detector configured to detect, in the detection region, an ionization current resulting from the ionized gas sample.

In some embodiments, the optical window is configured to substantially prevent transmission of UV photons having photon energies greater than about 8.5 eV, and wherein the transmitted UV radiation and the ionizing electric field are configured to ionize an analyte in the gas sample having an ionization energy greater than about 10 eV.

In some embodiments, the UV radiation source is configured to produce a dielectric barrier discharge plasma and generate the UV radiation from the dielectric barrier discharge plasma.

In some embodiment, the electric-field ionization source includes a pair of ionization electrodes disposed in a spaced-apart relationship on opposite sides outside of the ionization chamber, and an ionization power supply configured to apply an ionization drive signal to the ionization electrodes to generate the ionizing electric field in the ionization region.

In accordance with another aspect, there is provided a method of analyzing a gas sample, including:
  flowing the gas sample through an ionization chamber including an ionization region and a detection region;
  subjecting, in the ionization region, the gas sample to ionizing radiation and an ionizing electric field to ionize the gas sample into an ionized gas sample; and
  detecting, in the detection region, an ionization current resulting from the ionized gas sample to produce a detection signal conveying information about the gas sample.

In some embodiments, the ionizing radiation includes UV radiation.

In some embodiments, the method includes generating the ionizing radiation, and supplying the ionizing radiation into the ionization region. In some embodiments, generating the ionizing radiation includes energizing a discharge gas into a plasma, and producing the ionizing radiation from the plasma. In some embodiments, the plasma is a dielectric barrier discharge plasma. In some embodiments, generating the ionizing radiation includes operating a pair of UV lamps arranged with respect to the ionization chamber. In some embodiments, supplying the ionizing radiation into the ionization region includes transmitting the ionizing radiation through an optical window. In some embodiments, the optical window is made of a window material including lithium fluoride (LiF), magnesium fluoride ($MgF_2$), calcium fluoride ($CaF_2$), barium fluoride ($BaF_2$), strontium fluoride ($SrF_2$), sodium fluoride (NaF), sapphire ($Al_2O_3$), or quartz ($SiO_2$), or a combination thereof.

In some embodiments, the method further includes providing a pair of ionization electrodes, and applying an ionization drive signal to the ionization electrodes to generate the ionizing electric field in the ionization region.

In some embodiments, detecting the ionization current includes providing a pair of detection electrodes, biasing the detection electrodes to generate a detection electric field in the detection region to deflect ions and electrons in the ionized gas sample onto respective ones of the detection electrodes for collection by the detection electrodes; and measuring the ionization current based on the ions and electrons collected by the detection electrodes.

In accordance with another aspect, there is provided a GC system including a PID as described herein. For example, the GC system may include a sample handling unit configured to process the gas sample, a chromatographic separation unit, for example, a chromatographic column, configured to receive the sample from the gas sample handling unit and to perform a chromatographic separation of the gas sample. The PID may be configured to detect the chromatographically separated sample and generate therefrom a detection signal. The GC system may also include a control and processing unit configured to receive the detection signal from the PID and obtain a chromatogram of the sample from the detection signal. The sample handling unit may include a sample collector configured to collect or receive the gas sample, a sample conditioner configured to process the gas sample to make it suitable for GC analysis, and a sample injector configured to dose and inject the processed gas sample as part of a mobile phase into the chromatographic separation unit.

It is to be noted that other method and process steps may be performed prior to, during, or after the steps described herein. The order of one or more steps may also differ, and some of the steps may be omitted, repeated, and/or combined, depending on the application. It is also to be noted that some method and process steps may be performed using various data processing techniques, which may be implemented in hardware, software, firmware or any combination thereof.

Other objects, features, and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features can be combined with one another unless stated otherwise.

DETAILED DESCRIPTION

In the present description, similar features in the drawings have been given similar reference numerals. To avoid cluttering certain figures, some elements may not be indicated if they were already identified in a preceding figure. It is appreciated that the elements of the drawings are not necessarily depicted to scale, since emphasis is placed on clearly illustrating the structure and operation of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. It will be understood that such spatially relative terms are intended to encompass different orientations in the use or operation of the present embodiments, in addition to the orientations exemplified in the figures.

In the present description, the terms "a", "an", and "one" are defined to mean "at least one", that is, these terms do not exclude a plural number of elements, unless stated otherwise.

Terms such as "substantially", "generally", and "about", that modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or equivalent function or result). In some instances, the term "about" means a variation of ±10 percent of the stated value. It is noted that all numeric values used herein are assumed to be modified by the term "about", unless stated otherwise.

The terms "match", "matching", and "matched" are intended to refer to a condition in which two elements are either the same or within some predetermined tolerance of each other. That is, these terms are meant to encompass not only "exactly" or "identically" matching the two elements but also "substantially", "approximately" or "subjectively" matching the two elements, as well as providing a higher or best match among a plurality of matching possibilities.

Unless stated otherwise, the terms "connected", "coupled", and derivatives and variants thereof, refer to any connection or coupling, either direct or indirect, between two or more elements. The connection or coupling between the elements may be, for example, mechanical, optical, electrical, thermal, chemical, fluidic, magnetic, logical, operational, or any combination thereof.

In the present description, the term "concurrently" refers to two processes that occur during coincident or overlapping time periods. The term "concurrently" does not necessarily imply complete synchronicity, and encompasses various scenarios including time-coincident or simultaneous occurrence of two processes; occurrence of a first process that both begins and ends during the duration of a second process; and occurrence of a first process that begins during the duration of a second process, but ends after the completion of the second process.

The present description generally relates to photoionization detectors (PIDs) for detecting analytes in a gas sample, and to associated methods of use. Depending on the application, the PIDs disclosed herein may be adapted for use in a laboratory setting, such as in high-performance GC applications, or in the field. The disclosed PIDs may be fixed, portable, or handheld instruments, and may be externally powered or battery-powered.

PIDs are gas detection devices in which a gas sample is ionized by high-energy photons, typically in the VUV range. Conventional PIDs generally include a source of high-energy photons, an ionization chamber into which the high-energy photons are directed for ionizing the gas sample, and collection electrodes to which an electric potential difference is applied to collect ions and electrons present in the ionized gas sample. The collected ions and electrons produce an electric current, which conveys information associated with the gas sample, for example, about the concentration of an analyte in the gas sample. It is appreciated that the theory, instrumentation, operation, and applications of PIDs are generally known in the art, and need not be described in detail herein other than to facilitate an understanding of the present techniques.

In the present description, the terms "light" and "optical", and variants and derivatives thereof, are intended to refer to radiation in any appropriate region of the electromagnetic spectrum. These terms are not limited to visible light but also include invisible regions of the electromagnetic spectrum, for example, UV radiation. The spectrum of UV radiation is commonly defined as ranging from about 400 nm down to about 10 nm and can be further divided into a number of subregions. Conventional PIDs are typically operated with VUV radiation, in a wavelength range from about 150 nm down to about 100 nm, corresponding approximately to photon energies in a range between about 8.0 eV and about 12.0 eV. The VUV subregion is commonly defined as encompassing wavelengths ranging from 200 nm down to 10 nm. It is appreciated that the definitions of different UV subregions in terms of spectral ranges, as well as the dividing lines between them, can vary depending on the technical field under consideration, and are not meant to limit the scope of application of the present techniques. It is also appreciated that although the present techniques may be implemented or useful in PIDs using UV radiation sources, other embodiments could additionally or alternatively operate in other regions of the electromagnetic spectrum, for example, in the visible range.

In the present description, the term "gas sample" is intended to refer to any gaseous substance known, expected, or suspected to contain analytes. Gas samples can be broadly classified as organic, inorganic, or biological. Gas samples can include a mixture of analytes and non-analytes. The term "analyte" is intended to refer herein to any component of interest in a gas sample that can be detected by a PID according to the present techniques, while the term "non-analyte" is intended to refer to any sample component for which detection is not of interest in a given application. Non-limiting examples of non-analytes can include, to name a few, water, oils, solvents, and other media in which analytes may be found, as well as various impurities or contaminants. In some instances, terms such as "component", "compound", "constituent", and "species" may be used interchangeably with the term "analyte". The analytes of interest may include volatile organic compounds (VOCs). VOCs are organic chemicals that readily produce vapors at ambient temperatures, and are therefore emitted as gases from certain solids or liquids. VOCs include both human-made and naturally occurring chemical compounds. Non-limiting examples of VOCs include, to name a few, aromatics, alkenes, bromides and iodines, sulfides and mercaptans, organic amines, ketones, ethers, esters and acrylates, alcohols, aldehydes, alkanes, and alkyl halides. It is appreciated, however, that the present techniques may also be used to detect certain volatile inorganic compounds and semi-volatile organic compounds. In some embodiments, the measurable gas concentrations may range from about 1 ppb to about 10,000 ppm, although concentrations outside this range may be measured in other embodiments.

The present techniques may be used or implemented in various fields that may benefit from enhanced photoionization detectors. Non-limiting examples of fields include, to name a few, medical, including exhaled breath analysis; pharmaceutical; food analysis; environmental; petrochemical; toxicology; forensic; industrial hygiene; chemical process control; hazardous waste monitoring; soil remediation; indoor air quality testing; and gas leak detection.

Various embodiments disclosed herein may be used as detectors in gas chromatography (GC) applications. The term "gas chromatography" refers herein to an analytical or process technique for separating a gas sample or mixture into its individual components and for analyzing qualitatively and/or quantitatively the separated sample components. In most GC applications, the sample is transported in a carrier gas to form a mobile phase. The mobile phase is then carried through a stationary phase, which is located in a column or another separation device. The mobile and stationary phases are selected so that the components of the gas sample transported in the mobile phase exhibit different interaction strengths with the stationary phase. This difference in interaction strength leads to different sample components having different retention times through the system. Sample components that are strongly interacting with the stationary phase move more slowly with the flow of the mobile phase and elute from the column later than sample components that are weakly interacting with the stationary phase. As sample components separate, they elute from the column and enter a detector. The detector, such as a PID, is configured to generate a detection signal (e.g., an electrical signal) whenever the presence of a sample component is detected. The measurement data can be processed by a computer to obtain a chromatogram, which is a time series of peaks representing sample components as they elute from the column. The retention time of each peak is indicative of the composition of the corresponding eluting component, while the peak height or area conveys information of the amount or concentration of the eluting component. It is appreciated, however, that various other embodiments disclosed herein may be used in technical fields other than GC. Non-limiting examples of such technical fields include, to name a few, gas purification systems, gas leak detection systems, and online gas analyzers without chromatographic separation.

Various possible implementations of the present techniques will now be described with reference to FIGS. 1 to 3, which illustrate several views of a possible embodiment of a PID 100 for analyzing a gas sample 102.

The gas sample 102 may include any gaseous substance—including gases, vaporized liquids, and vaporized solids—known, expected, or suspected to contain analytes that may be ionized and detected using the present techniques. For example, the gas sample 102 may include a mixture of analytes 104, such as VOCs, flowing in a carrier gas 106. Non-limiting examples of carrier gases include, to name a few, helium, nitrogen, argon, air, oxygen, and hydrogen. The ionization energies of the analytes 104 of interest may be less than that of the carrier gas 106. In some implementations, the gas sample 102 may originate from a GC column. In this case, the gas sample 102 may be a stream of analytes entrained in a carrier gas flow, where different analytes elute from the GC column and reach the PID 100 at different times. The PID 100 may sequentially detect the different analytes and may output electrical signals representing analyte measurements. The electrical signals may be processed to produce a chromatogram. However, as noted above, the PID 100 may be used to analyze gas samples in various applications other than GC.

Figure 1:
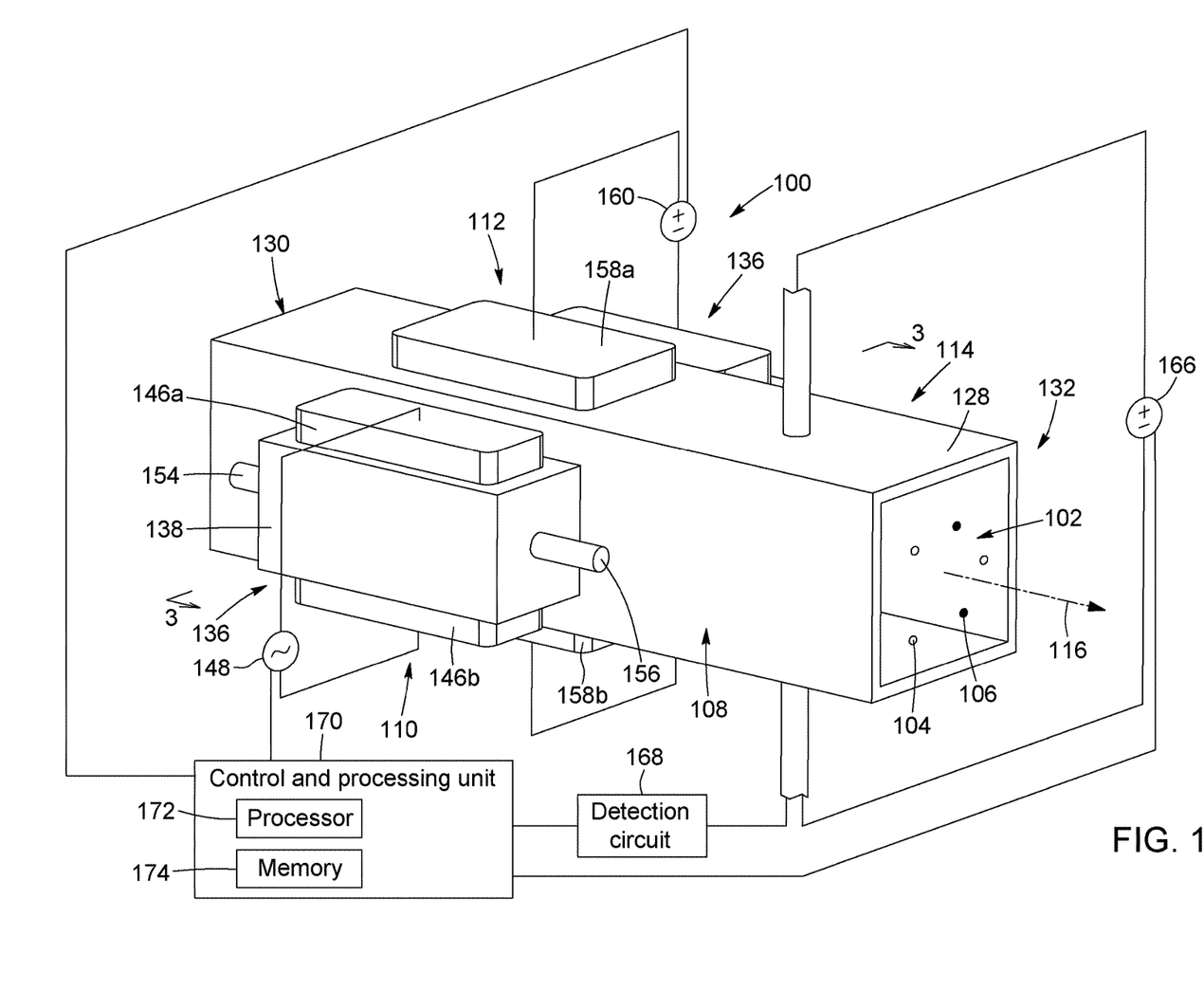
FIG. 1 is a perspective view of a PID, in accordance with an embodiment.
Figure 2:
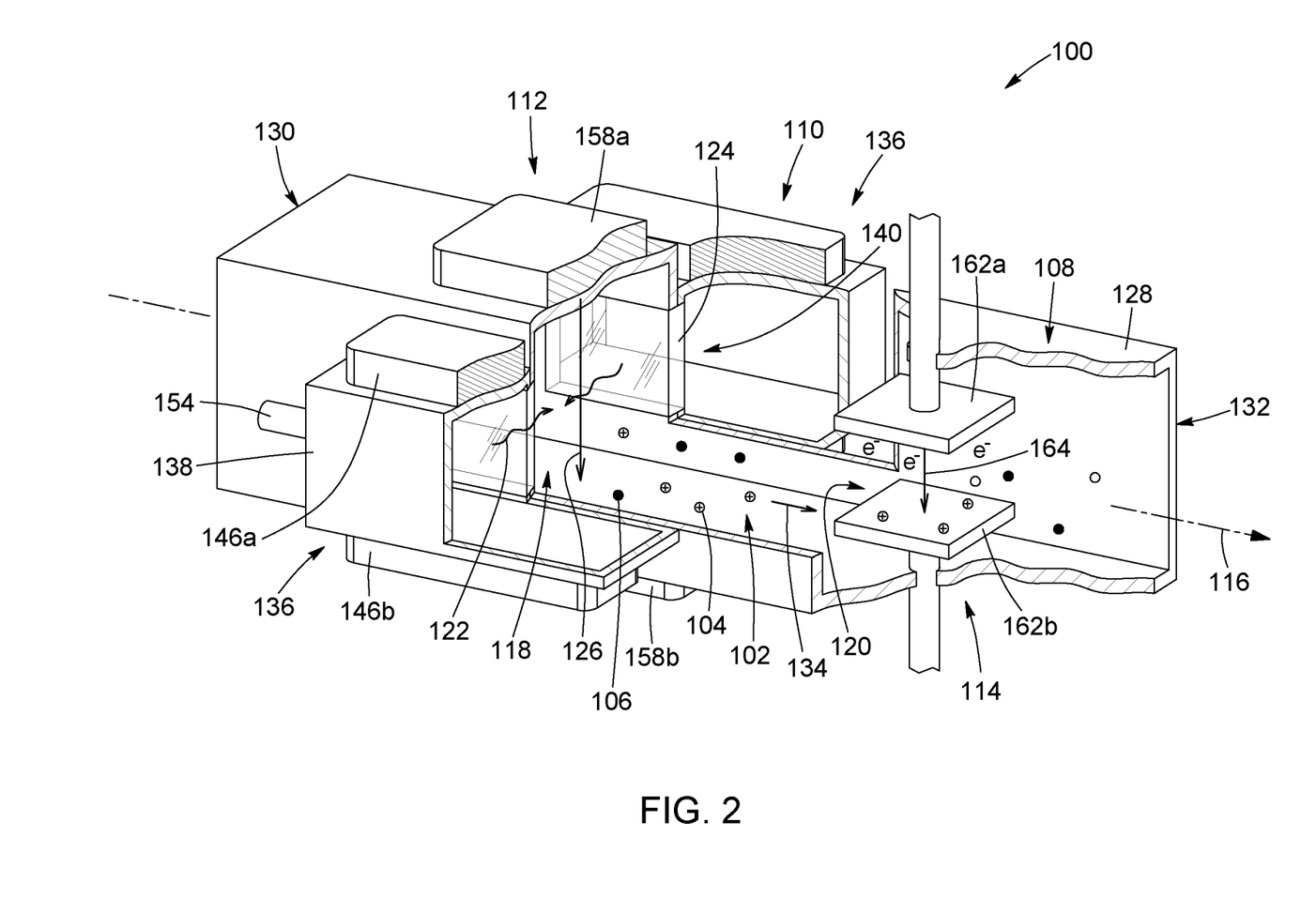
FIG. 2 is a partially cutaway perspective view of the PID of FIG. 1.
Figure 3:
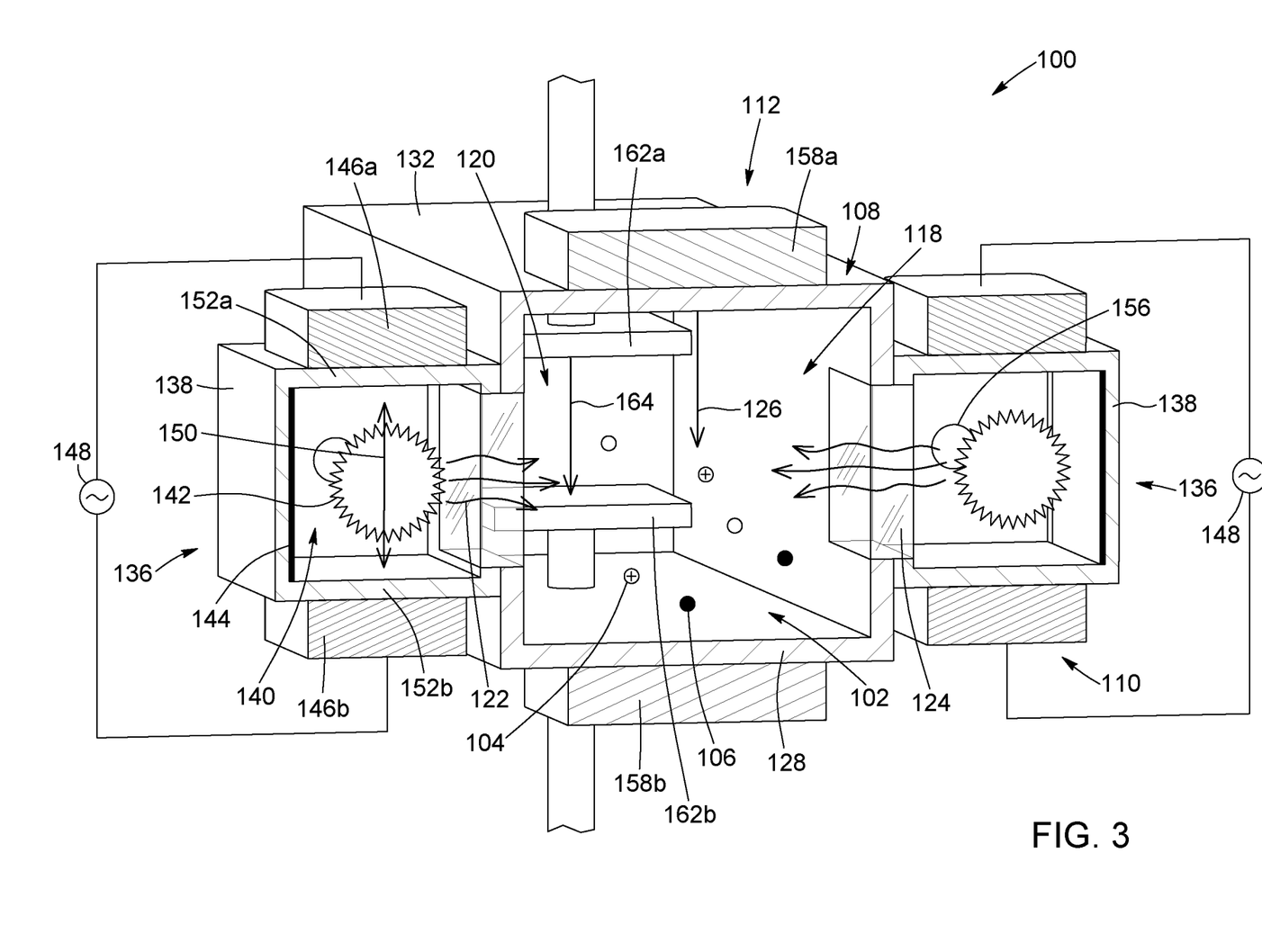
FIG. 3 is cross-sectional perspective view of the PID of FIG. 1 taken along section line 3-3 in FIG. 1.

The PID 100 depicted in FIGS. 1 to 3 generally includes an ionization chamber 108, a photoionization source 110, an electric-field ionization source 112, and an ion detector 114. The ionization chamber 108 is configured to allow the gas sample 102 to flow therethrough along a longitudinal flow axis 116. The ionization chamber 108 defines an ionization region 118 and a detection region 120. The detection region 120 is downstream of the ionization region 118 with respect to the flow of the gas sample 102. The photoionization source 110, which may be a UV-radiation source, is configured to generate ionizing radiation 122 for irradiating the flow of the gas sample 102 in the ionization region 118. The photoionization source 110 may include one or more optical windows 124 configured to transmit at least part of the generated ionizing radiation 122 into the ionization chamber 108 to irradiate the flow of the gas sample 102 in the ionization region 118. The electric-field ionization source 112 is configured to apply an ionizing electric field 126 inside the ionization chamber 108. The ionizing electric field 126 is configured to intersect the flow of the gas sample 102 in the ionization region 118. The ionizing radiation 122 and the ionizing electric field 126 combine to ionize the gas sample 102 into an ionized gas sample. The ion detector 114 is configured to measure, in the detection region 120, an ionization current resulting from the ionized gas sample 102. It is noted that the gas sample will be designated by reference 102 both before and after ionization. The structure and operation of these and other possible components of the PID 100 are described in greater detail below.

In the present description, the term "ionizing" generally refers to the capability of removing one or more electrons from a neutral atom or molecule, resulting in the formation of a positively charged particle, referred to as an ion, and one or more free electrons. In particular, the term "ionizing radiation" refers to any electromagnetic radiation that is capable of producing ions and free electrons, either alone (referred to herein as "pure photoionization", or simply "photoionization") or assisted by an applied electrical field (referred to herein as "field-assisted photoionization"). In the present description, an applied electrical field used in combination with ionizing radiation to achieve field-assisted photoionization is referred to as an "ionizing electric field". Furthermore, the term "ionized gas sample" is intended to encompass both a gas sample that is completely ionized and a gas that is partially ionized.

It is appreciated that FIGS. 1 to 3 provide simplified schematic representations that aim to illustrate a number of basic components of the PID 100 such that additional components and features that may be useful or necessary for the practical operation of the PID 100 may not be specifically depicted. Non-limiting examples of such additional features and components can include, to name a few, power supplies, electrical connections, gas sources, gas supply lines (e.g., conduits, such as pipes or tubes), pressure and flow control devices (e.g., pumps, valves, regulators, restrictors), and other types of hardware and equipment.

The ionization chamber 108 is configured to receive the gas sample 102 to be analyzed. In the illustrated embodiment, the ionization chamber 108 generally includes a chamber body 128, a sample inlet 130 configured to receive the gas sample 102 into the chamber body 128, and a sample outlet 132 configured to discharge the gas sample 102 from the chamber body 128. For example, in GC applications, the sample inlet 130 may receive the gas sample 102 from a GC column or an upstream GC detector, while the sample outlet 132 may discharge the gas sample 102 to a downstream GC detector, other downstream equipment, or to the atmosphere.

The chamber body 128 encloses an interior volume that defines an ionization region 118 and a detection region 120. The interior volume also provides a sample flow path 134 extending along the longitudinal flow axis 116 and allowing the gas sample 102 to flow successively through the ionization region 118 and the detection region 120, from the sample inlet 130 to the sample outlet 132. For illustrative purposes, the chamber body 128 is depicted as a longitudinally elongated tubular enclosure (e.g., of length ranging from about 5 mm to about 30 mm) with a square cross-section (e.g., of side ranging from about 0.1 mm to about 2 mm). However, it is appreciated that the shape, dimensions, and construction of the ionization chamber 108 may be varied depending on the application. The chamber body 128 may be made of various materials including, but not limited to, dielectric materials, such as polytetrafluoroethylene (PTFE), polyetheretherketone (PEEK), and other synthetic polymer materials.

In some embodiments, a pressure control system (not shown) may be provided to control the operating pressure inside the ionization chamber 108. For example, in some embodiments, the gas pressure inside the ionization chamber 108 may range from about 10 Pa to about 200 kPa, although other ranges of pressure may be used in other embodiments.

Referring still to FIGS. 1 to 3, the photoionization source 110 is configured to emit ionizing radiation 122 inside the ionization chamber 108 through the one or more optical windows 124 so as to irradiate the gas sample 102 as the gas sample 102 flows in the ionization region 118. The ionizing radiation 122 generated by the photoionization source 110 contains high-energy photons capable, either alone or together with the ionizing electric field 126 applied by the electric-field ionization source 112, to ionize one or more analytes 104 in the gas sample 102. It is appreciated that many types of photoionization sources are known in the art and may be used in the PIDs disclosed herein.

The photoionization source 110 may be configured to emit the ionizing radiation 122 in the UV region of the electromagnetic spectrum, typically in the VUV subregion, and more particularly in a wavelength range from about 150 nm down to about 100 nm, corresponding approximately to photon energies in a range between about 8.0 eV and about 12.0 eV. Such photon energies may allow various analytes of interest to be ionized without or with low or negligible accompanying ionization of typical carrier gases. It is appreciated that while various embodiments of the present techniques use ionizing radiation lying in the UV range, some embodiments may use ionizing radiation lying in other spectral ranges, for example, the visible range.

In the illustrated embodiment, the photoionization source 110 includes a pair of UV lamps 136 disposed in a face-to-face relationship on opposite sides of the chamber body 128 of the ionization chamber 108. Depending on the application, the two UV lamps 136 may or may not be identical and may or may not be disposed in a symmetrical configuration with respect to the ionization chamber 108. It is also appreciated that while two UV lamps 136 are depicted in FIGS. 1 to 3, other embodiments may alternatively include a single UV lamp or more than two UV lamps. It is further appreciated that in embodiments where the photoionization source 110 includes multiple UV lamps 136, each UV lamp 136 may have its own characteristics (e.g., in terms of emission characteristics, discharge gas, and operating pressure and temperature, to name a few), which may or may not be same as the characteristics of the one or more other UV lamps 136. Additionally, the characteristics of a particular UV lamp 136 may be selected in accordance with various application-specific factors (e.g., the composition of the target analytes and the chromatographic conditions, to name a few). Depending on the application, these characteristics may be varied or kept constant during operation. By way of example, the composition of the discharge gas or the operating conditions of any UV lamp 136 may be changed during operation of the PID 100, for example, to change its emission characteristics.

Each UV lamp 136 may include a lamp body 138 that encloses an interior volume defining a discharge region 140 adapted to receive a discharge gas therein. The lamp body 138 may be made of a dielectric material, for example a glass, such as quartz, fused silica, or borosilicate glass. The discharge gas may be any gas or combination of gases from which can be generated a gas discharge plasma 142 accompanied by emission of radiation, notably UV radiation. Non-limiting examples of possible discharge gases include, to name a few, argon (Ar), xenon (Xe), krypton (Kr), neon (Ne), helium (He), hydrogen ($H_2$), oxygen ($O_2$), nitrogen ($N_2$), and a combination thereof. It is appreciated that the energy of the UV photons emitted by the plasma 142 depends, at least in part, on the composition of the discharge gas.

Each UV lamp 136 may also include at least one optical window 124 mounted to the lamp body 138. The optical window 124 may be accommodated in a corresponding opening formed in the lamp body 138, for example, in a wall of the lamp body 138 adjacent to the ionization chamber 108. In the illustrated embodiment, the optical window 124 of each UV lamp 136 is disposed in front of a corresponding opening formed in the chamber body 128 of the ionization chamber 108. Furthermore, the surface normal to the optical window 124 of each UV lamp 36 is perpendicular to the longitudinal flow axis 116 along which the gas sample 102 flows in the ionization chamber 108, although other orientations are possible in other variants. In some implementations, the optical window 124 may be removably mounted to the lamp body 138. In this case, removal of the optical window 124 may be performed for inspection, cleaning, repair, replacement, and/or any other suitable maintenance operations.

The optical window 124 may be made of a material having a high UV transmittance in a certain spectral range. The optical window 124 acts as a cutoff filter that determines the spectrum of the ionizing radiation 122 produced in the discharge region 140 that exits the UV lamp 136 into the ionization chamber 108 to irradiate the gas sample 102 flowing in the ionization region 118. The optical window 124 may be characterized by a high-cutoff photon energy, beyond which its transmittance drops significantly to become low or negligible from a practical standpoint. Thus, while the type of discharge gas may determine the energy of the UV photons produced inside the UV lamp 136, the optical window 124 may control which of these photons are allowed to exit the UV lamp 136 and enter the ionization chamber 108.

Non-limiting examples of window material include, to name a few, crystalline materials, such as lithium fluoride (LiF), magnesium fluoride ($MgF_2$), calcium fluoride ($CaF_2$), barium fluoride ($BaF_2$), strontium fluoride ($SrF_2$), sodium fluoride (NaF), sapphire ($Al_2O_3$), quartz ($SiO_2$), combinations thereof, and any suitable current or future window materials. Since different window materials generally have different transmittance spectra, the highest-energy photons that are transmitted into the ionization chamber 108 may be controlled by the choice of the window material. It is appreciated that in embodiments that include more than one optical window—for example, in the case of PIDs that include two or more UV lamps, each of which with its respective optical window—the different optical windows may or may not have the same composition. In addition to its chemical composition, the transmittance of the optical window 124 may depend on its thickness, crystal structure and orientation, fabrication process, surface morphology, and age. In some implementations, the optical window 124 may have a thickness ranging from about 0.1 mm to about 1 mm, although other thicknesses may be used in other variants.

In some embodiments, each UV lamp 136 may include a UV mirror 144 mounted inside the lamp body 138 to direct or help direct the UV radiation emitted from the plasma 142 toward the optical window 124. For example, in the illustrated embodiment, the UV mirror 144 is provided on a wall of the lamp body 138 opposite to the wall of the lamp body 138 on which is formed the opening for accommodating the optical window 124. For example, the UV mirror 144 may be made of a thin layer of UV-reflective material, such as an aluminum (Al) or magnesium coating (Mg).

It is appreciated that various methods are available for exciting the discharge gas inside each UV lamp 136 and generate the plasma 142 from which UV radiation is emitted. Non-limiting examples of excitation methods include, to name a few, a continuous direct current (DC) discharge, a pulsed DC discharge, an alternating current (AC) discharge, a dielectric barrier discharge (DBD), a corona discharge, a radio frequency (RF) discharge, a microwave (MW) discharge, a hollow cathode (HC) discharge, an inductive coupled plasma (ICP) discharge, and a capacitively coupled plasma (CCP) discharge. It is appreciated that the theory and implementation of excitation methods for UV lamps is generally known in the art and need not be described in detail herein other than to facilitate an understanding of the present techniques.

For example, in FIGS. 1 to 3, the UV lamps 136 are each configured for implementing a DBD-based excitation method. It is appreciated that the excitation method depicted in FIGS. 1 to 3 is for illustrative purposes only and could be replaced with other excitation methods, whether DBD-based or not, to suit a particular application, as would be apparent to one skilled in the art.

Each UV lamp 136 may include a pair of plate-shaped discharge electrodes 146a, 146b disposed in a spaced-apart, and preferably parallel, relationship on opposite sides of the lamp body 138. The discharge electrodes 146a, 146b defines a discharge gap therebetween in the discharge region 140. In some embodiments, the discharge gap may have a height ranging from about 0.1 mm to about 2 mm. The discharge electrodes 146a, 146b may be made of any suitable electrically conducting material, such as various metals, metal alloys, and semiconducting materials. It is appreciated that the number, size, shape, composition, structure, and arrangement of the discharge electrodes 146a, 146b may be varied depending on the application.

Each UV lamp 136 may also include or be coupled to a lamp power supply 148 and associated electronic circuitry connected to the pair of discharge electrodes 146a, 146b via appropriate electrical connections. Alternatively, the UV lamps 136 may share a common power supply. The lamp power supply 148 is configured to apply a discharge drive signal to the discharge electrodes 146a, 146b to create a discharge electric field 150 configured to generate a plasma 142 that emits UV radiation in the discharge region 140 and to maintain the plasma 142 in a stable state for any desired period of time. In the illustrated embodiment, the discharge electric field 150 is perpendicular to the surface normal to the optical window 124, although different configurations are possible in other embodiments.

Depending on the application, the lamp power supply 148 may be voltage-controlled or current-controlled. The discharge drive signal may be a periodic time-varying voltage or current of an appropriate waveform, such as sinusoidal, square, triangular, or sawtooth. Alternatively, pulsed DC signals may be used. In some embodiments, the discharge drive signal may be a periodic time-varying voltage having a frequency ranging from about 1 kHz to about 100 kHz and a peak-to-peak magnitude ranging from about 500 V to about 5 kV, although other values may be used in other embodiments. It is appreciated that the characteristics of the discharge drive signal may be selected in view of the nature of the discharge and the operating conditions of the UV lamp 136 in order to favor breakdown of the discharge gas and generation of a plasma 142. In particular, it is appreciated that the peak-to-peak voltage required to create a DBD may depend on several application-specific factors, such as the ease of ionization of the discharge gas and its pressure in the discharge region 140.

Each UV lamp 136 may also include one or more dielectric barriers 152a, 152b disposed in the discharge gap between the discharge electrodes 146a, 146b. For example, a pair of dielectric barriers 152a, 152b may be provided, each of which extending along and adjacent to a corresponding one of the discharge electrodes 146a, 146b. In the illustrated embodiment, the dielectric barriers 152a, 152b may be embodied by opposite walls of the lamp body 138, which, as mentioned above, may be made of a glass or another suitable dielectric material. This allows the discharge electrodes 146a, 146b to be disposed outside the lamp body 138 in which the plasma 142 is generated. In such a configuration, the discharge electrodes 146a, 146b are not exposed to the filamentary micro-discharges produced by the DBD, thereby avoiding sputter contamination and erosion of electrode material. It is also appreciated that the plasma 142 itself—that is, the ions, electrons, and other species produced in the plasma 142—remains within the lamp body 138 of the UV lamp 136. Thus, only the ionizing radiation 122 that passes through the optical window 124 can enter the ionization chamber 108 to irradiate the gas sample 102.

Referring still to FIGS. 1 to 3, each UV lamp 136 may also include one or more gas ports 154, 156 formed through the lamp body 138 to provide gas communication between the discharge region 140 and the exterior of the lamp body 138. The one or more gas ports 154, 156 may be hermetically sealed by appropriate sealing components, such as plugs or valves. Depending on the application, the one or more gas ports 154, 156 may be sealed either permanently or non-permanently. In the first case, the fabrication process of the UV lamp 136 may involve successive steps of emptying and cleaning the lamp body 138; filling the lamp body 138 with a desired type of discharge gas via the one or more gas ports 154, 156; and hermetically sealing the one or more gas ports 154, 156 and keeping them as such for the lifetime of the UV lamp 136. In the second case, the sealing components may be removable, for example, to purge the discharge region 140, after which the UV lamp 136 may be refilled with the same or a different discharge gas, under either the same or different pressure and temperature conditions.

In the illustrated embodiment, the one or more gas ports 154, 156 include a discharge gas inlet 154 and a discharge gas outlet 156, which may be connected to a gas circulation system (not shown). The gas circulation system may be configured to circulate, either continuously or at intervals, a flow of the discharge gas through the discharge region 140, from the discharge gas inlet 154 to the discharge gas outlet 156. In the illustrated embodiment, the flow of the discharge gas inside the UV lamp 136, the discharge electric field 150, and the surface normal to the optical window 124 are mutually perpendicular to one another. However, other embodiments may use different configurations. It is appreciated that circulating a flow of the discharge gas inside the UV lamp 136 during operation may be useful, for example, for removing contaminants formed during the plasma discharge or heat from the UV lamp 136. Non-limiting examples of contaminants include sputter deposits and other undesirable surface contaminants that may otherwise accumulate or form on the optical window 124 and the inner wall of the lamp body 138. The gas circulation system may also or alternatively be configured to fill and purge the UV lamp 136. It is appreciated that the gas circulation system may include a variety of components including, but not limited, one or more discharge gas sources or reservoirs (e.g., gas tanks), gas lines (e.g., conduits, such as tubes or pipes for connection to the discharge gas inlet 154 and the discharge gas outlet 156), flow regulators (e.g., pumps, valves, and restrictors) to control the flow of discharge gas, and the like. In some embodiments, the gas circulation system may be configured to enable selection between different types of gases and gas mixtures, which may include dopant gases, for use as the discharge gas in the UV lamp 136.

Referring still to FIGS. 1 to 3, in some embodiments, a pressure control system (not shown) may be provided to control the operating pressure inside the UV lamps 136. For example, in some embodiments, the pressure inside the UV lamps 136 may range from about 10 Pa to about 200 kPa, although other ranges of pressure may be used in other embodiments. Depending on the application, the pressure control system associated with the UV lamps 136 may or may not be same as that associated with the ionization chamber 108.

Common commercial PID lamps have highest photon energy levels of approximately 8.4 eV (lamp window: $Al_2O_3$; discharge gas: Xe), 9.6 eV (lamp window: $BaF_2$; discharge gas: Xe), 10.0 eV (lamp window: $CaF_2$ discharge gas: Kr), 10.2 eV (lamp window: $MgF_2$; discharge gas: $H_2$), 10.6 eV (lamp window: $MgF_2$; discharge gas: Kr), and 11.7 eV (lamp window: LiF; discharge gas: Ar). Such photon energies are generally sufficient to ionize a wide range of VOCs of interest but insufficient to ionize common carrier gases and the major components of air, whose ionization energies are generally above 12.0 eV. Higher-energy lamps, whose optical windows are typically made of $CaF_2$, $MgF_2$, or LiF, may respond to a broader range of analytes. However, these higher-energy lamps tend to suffer from a limited lifetime and gradual performance degradation, which may be caused by a number of factors, including window deterioration, gas leakage, water ingress, and sputter contamination induced by electron and photon bombardment occurring during the discharge process. In particular, PID lamp windows made of fluoride crystals, such as $CaF_2$, $MgF_2$, and LiF, tend to be prone to degradation and contamination, notably by solarization, water etching, window fogging, surface deposit formation, and moisture-induced corrosion. This susceptibility to degradation and contamination, which generally increases with increasing photon energies, entails regular and often overly frequent inspection, cleaning, repair, and replacement of windows made of $CaF_2$, $MgF_2$, or LiF. Such recurrent maintenance operations are generally undesirable, especially given the relative fragility and high cost of fluoride crystal window materials, as well as the resulting lost productivity caused by the increased downtime.

In some implementations, the PID 100 may include one or more optical windows 124 made of a window material whose highest-energy transmitted photons are less energetic than those of common fluoride crystal materials, such as $CaF_2$, $MgF_2$, and LiF, while still allowing the detection of analytes over a comparable broad range of ionization energies. As discussed in greater detail below, this is made possible by the fact that, in the present techniques, the ionization of the gas sample 102 is achieved by the combined action of the ionizing radiation 122 produced by the photoionization source 110 and the ionizing electric field 126 applied by the electric-field ionization source 112.

For example, in the PID 100 of FIGS. 1 to 3, the optical window 124 of each UV lamp 136 may be made of sapphire. Sapphire optical windows exhibit high mechanical strength, high chemical resistance, and high thermal stability. The properties can make sapphire optical windows advantageous in various applications where lifetime, stability, ease of handling, and/or resistance to mechanical, chemical, and/or thermal wear are of consideration. Because sapphire is the second hardest naturally occurring material on Earth, behind diamond, sapphire optical windows may be made thinner than other common window materials, resulting in improved optical transmittance. Furthermore, UV-grade sapphire has a high resistance to solarization and other sources of UV damage. However, because UV-grade sapphire exhibits a sharp decrease in transmittance above around 8.5 eV, a PID lamp with a sapphire window will not ionize analytes with ionization energies above this level. Thus, the range of detectable analytes associated with lamp windows made of sapphire may be significantly reduced compared to the range associated with lamp windows made of fluoride crystals, such as $CaF_2$, $MgF_2$, and LiF. In some applications, this reduced detection range may be undesirable or unacceptable.

In the illustrated embodiment, however, the gas sample 102 is ionized not by photoionization alone, but by field-assisted photoionization, due to the ionizing electric field 126 applied by the electric-field ionization source 112 in the ionization region 118. This means that with the assistance of the ionizing electric field 126, a target analyte 104 having an ionization energy of, say, 10 eV may become ionizable and subsequently detectable, which would otherwise not be achievable by photoionization alone with sapphire lamp windows 124, given that sapphire is not or only weakly transmissive to photon energies above 8.5 eV. Thus, by using field-assisted photoionization, the PID 100 may benefit from the enhanced mechanical, chemical, and thermal robustness and durability of sapphire windows compared to those of common fluoride crystal windows, but without or with less of the limitation of the reduced range of detectable analytes typically of sapphire windows.

Referring still to FIGS. 1 to 3, the electric-field ionization source 112 is configured to apply the ionizing electric field 126 inside the ionization chamber 108 in order to intersect the flow of the gas sample 102 in the ionization region 118. The ionizing electric field 126 combines with the ionizing radiation 122 emitted by the photoionization source to ionize the gas sample 102.

The electric-field ionization source 112 may include a pair of plate-shaped ionization electrodes 158a, 158b disposed in a spaced-apart, and preferably parallel, relationship on opposite sides of the ionization chamber 108. In the illustrated embodiment, the ionization electrodes 158a, 158b are disposed outside the ionization chamber 108. The ionization electrodes 158a, 158b may be located at substantially the same longitudinal position along the sample flow path 134 as the UV lamps 136 with respect to the ionization chamber 108. This may ensure or help ensure that the ionizing radiation 122 and the ionizing electric field 126 interact with the flowing gas sample 102 concurrently and with a suitable degree of spatial overlap so as allow efficient field-assisted photoionization of the gas sample 102. The ionization electrodes 158a, 158b may be made of any suitable electrically conducting material, such as various metals, metal alloys, and semiconducting materials. It is appreciated that the number, size, shape, composition structure, and arrangement of the ionization electrodes 158a, 158b may be varied depending on the application.

The electric-field ionization source 112 may also include or be coupled to an ionization power supply 160 and associated electronic circuitry connected to the ionization electrodes 158a, 158b via appropriate electrical connections. The ionization power supply 160 is configured to apply an ionization drive signal to the ionization electrodes 158a, 158b to generate the ionizing electric field 126 in the ionization region 118. Depending on the application, the ionization power supply 160 may be voltage-controlled or current-controlled. In the illustrated embodiment, the ionizing electric field 126, the surface normal to the optical window 124, and the longitudinal flow axis 116 are mutually perpendicular to one another. However, other embodiments may use different configurations.

In some embodiments, the ionizing drive signal may be a direct current (DC) signal. In the present description, the term "direct current" refers to electric signals characterized by a unidirectional flow of electric charge, without change in polarity, in contrast with the term "alternating current", which refers to electrical signals characterized by a bidirectional flow of electric charge accompanied by changes in polarity. The term "direct current" includes both continuous and pulsed direct current. In particular, DC electrical signals may be of constant magnitude or may vary with time, either abruptly (e.g., square waveform) or gradually (e.g., ramped waveform) so that various types of DC waveforms are possible, including fully and partially rectified waveforms. However, in other embodiments, low-frequency AC signals (e.g., in a range from about 100 Hz to about 10 kHz, although other ranges could be used) may also be used for generating the ionizing electric field 126.

The ionization drive signal applied to the ionization electrodes 158a, 158b may be of sufficiently high magnitude to allow the resulting ionizing electric field 126 to be strong enough to assist photoionization in a meaningful way. In some embodiments, the ionizing electric field 126 may have a magnitude ranging from about $10^5$ V/m to about $5 \times 10^7$ V/m, although other field strength values may be used in other embodiments. It is appreciated that the strength of the ionizing electric field 126 may be controlled by the configuration of the ionization electrodes 158a, 158b (e.g., their size, shape, composition, structure, and arrangement) and the characteristics of the ionization drive signal applied to the ionization electrodes 158a, 158b by the ionization power supply 160 (e.g., its magnitude and waveform). Depending on the application, the ionizing electric field 126 may or may not be spatially uniform in the ionization region 118, and its strength may be selected in accordance with various operating conditions, such as the gas pressure inside the ionization chamber 108.

The characteristics of the ionization drive signal may be selected in view of several application-specific factors, such as the range of ionization energies of the analytes 104 in the gas sample 102. In some embodiments, the ionizing electric field 126 may be sufficiently strong to increase the upper limit of the range of ionization energies of the analytes that may be detected by the PID 100 by an amount ranging from about 1 eV to about 4 eV, although values outside this range are possible in other embodiments. For example, a conventional PID including a UV lamp with a sapphire window may detect, using photoionization alone, analytes with ionization energies up to about 8.5 eV. In contrast, a PID such as disclosed herein and including the same or a similar sapphire UV lamp may detect, using field-assisted photoionization, analytes with ionization energies up to about 12.5 eV. This is because the ionizing electric field is configured to supplement the missing energy for ionizing analytes with higher ionization energies, which otherwise would not be ionizable solely by the UV radiation produced by the sapphire UV lamp.

It is appreciated that by using field-assisted photoionization, the disclosed PIDs may use more durable yet lower-energy UV lamps, such as UV lamps with sapphire windows, while responding to compounds with a range of ionization energies that is comparable to the range offered by higher-energy yet less durable UV lamps, such as those based on $CaF_2$, $MgF_2$, LiF, and other fluoride crystals.

It is also appreciated that by varying the strength of the ionizing electric field, either in operation or between operations, the selectivity of the disclosed PIDs may be adjusted in accordance with various application-specific factors, such as the range of ionization energies of the target analytes, with the selectivity generally varying inversely with electric field strength. Such a control over selectivity is generally not readily achievable in conventional PIDs that rely solely on photoionization for ionization.

In some implementations, the disclosed PIDs may include UV lamps that have windows made of fluoride crystals but that are configured for operation at lower photon energy levels than in conventional PIDs, in an attempt to extend their lifetime. In such a case, the impact that the reduction in highest photon energies may have on the range of detectable analytes may be mitigated or even eliminated by the application of the ionizing electric field to provide field-assisted photoionization. In some implementations, highest photon energies may be reduced by selection of the discharge gas, which, in some cases, may involve adding one or more dopant gases to the selected discharge gas. For example, in some embodiments, a discharge gas made of helium may be doped with a small amount of argon, krypton, nitrogen, or a combination thereof in order to reduce the energy of the emitted photons.

In some implementations, the disclosed PIDs may include multiple optical windows that do not all have the same composition. In one variant, a PID may include a pair of UV lamps whose respective optical windows are made of different materials. For example, the optical window of one of the UV lamp may be made of sapphire and the optical window of the other UV lamp may be made of a fluoride crystal, such as $CaF_2$, $MgF_2$, and LiF. Depending on the application, the two UV lamps may or may not be active at the same time during the operation of the PID. For example, in some scenarios, the fluoride crystal UV lamp may be activated only when its use is required or particularly useful, thus contributing to effectively increasing its lifetime.

In some implementations, the intensity of photon emission may be reduced by increasing the pressure of the discharge gas in the discharge region. This is because increasing the pressure tends to reduce the electron mean free path and, thus, the electron drift velocity, which in turn tends to reduce the number of emitted photons. Reducing the intensity of photon emission may extend or help extend the lifetime of PID lamps.

Referring still to FIGS. 1 to 3, the ion detector 114 is configured to measure, in the detection region 120, an ionization current resulting from the ionized gas sample 102. The ion detector 114 may include a pair of detection electrodes 162a, 162b disposed in the detection region 120. In the illustrated embodiment, the detection electrodes 162a, 162b are plate-shaped and disposed in a spaced-apart, parallel relationship inside the ionization chamber 108. The detection electrodes 162a, 162b may be made of any suitable electrically conducting material, such as various metals, metal alloys, and semiconducting materials. It is appreciated that the number, size, shape, composition, structure, and arrangement of the detection electrodes 162a, 162b may be varied depending on the application, as would be apparent to one skilled in the art. The detection electrodes 162a, 162b have a bias voltage applied between them that generates a detection electric field 164 in the detection region 120. In the illustrated embodiment, the detection electric field 164, the surface normal to the optical window 124, and the longitudinal flow axis 116 are mutually perpendicular to one another. However, other embodiments may use different configurations.

The ion detector 114 may also include or be coupled to a detection power supply 166 and associated electronic circuitry connected to the detection electrodes 162a, 162b via appropriate electrical connections. The detection power supply 166 is configured to establish and maintain a bias voltage between the detection electrodes 162a, 162b to generate the detection electric field 164 in the detection region 120. In some embodiments, the bias voltage may be a DC voltage having a magnitude ranging from about 50 V to about 150 V, although values outside this range may be used in other embodiments. The detection electric field 164 deflects and separates the ions and the electrons in the flow of the ionized gas sample 102 such that one detection electrode collects the ions, and the other detection electrode collects the electrons.

The ion detector 114 may further include a detection circuit 168 electrically connected to the detection electrodes 162a, 162b via appropriate electrical connections. The detection circuit 168 is configured to measure the ionization current resulting from the ions and electrons collected by the detection electrodes 162a, 162b and to output a detection signal representative of the measured ionization current. Depending on the application, the detection circuit 168 may have various configurations, as would be apparent to one skilled in the art. Non-limiting examples of such configurations include, to name a few, a transimpedance amplifier configuration, a current-integrating amplifier configuration, and a logarithmic amplifier configuration.

Referring still to FIGS. 1 to 3, the PID 100 may further include a control and processing unit 170. The control and processing unit 170 may be configured to control, monitor, and/or coordinate the functions and operations of various components of the PID 100, for example, the ionization chamber 108, the photoionization source 110, the electric-field ionization source 112, and the ion detector 114, as well as various pressure, temperature and flow rate conditions. The control and processing unit 170 may also be configured to analyze the detection signal received from the detection circuit 168 to derive information about the presence and concentration of analytes 104 in the gas sample 102, for example, based on calibration to known standard gases. In GC applications, the control and processing unit 170 may process the detection signal into a chromatogram. It is appreciated that the principles underlying the processing of chromatographic data to derive analytical information about a test sample are generally known in the art and need not be described in detail herein other than to facilitate an understanding of the present techniques.

The control and processing unit 170 may be implemented in hardware, software, firmware, or any combination thereof, and be connected to various components of the PID 100 via wired and/or wireless communication links to send and/or receive various types of electrical signals, such as timing and control signals, measurement signals, and data signals. The control and processing unit 170 may be controlled by direct user input and/or programmed instructions, and may include an operating system configured to control and manage various functions of the PID 100. Depending on the application, the control and processing unit 170 may be fully or partly integrated with, or physically separate from, the other hardware components of the PID 100. In the illustrated embodiment, the control and processing unit 170 generally includes a processor 172 and a memory 174.

The processor 172 may include or be part of a computer; a microprocessor; a microcontroller; a coprocessor; a central processing unit (CPU); an image signal processor (ISP); a digital signal processor (DSP) running on a system on a chip (SoC); a single-board computer (SBC); a dedicated graphics processing unit (GPU); a special-purpose programmable logic device embodied in hardware device, such as, for example, a field-programmable gate array (FPGA) or an application-specific integrated circuit (ASIC); a digital processor; an analog processor; a digital circuit designed to process information; an analog circuit designed to process information; a state machine; and/or other mechanisms configured to electronically process information and to operate collectively as a processor. Depending on the application, the processor 172 may include a single processing unit or a plurality of processing units. The plurality of processing units may be physically located within the same device, or the processor 172 may represent processing functionality of a plurality of devices operating in coordination.

The memory 174, which can also be referred to as a computer readable storage medium, is capable of storing computer programs and other data to be retrieved by the processor 172. In the present description, the terms "computer readable storage medium" and "computer readable memory" are intended to refer to a non-transitory and tangible computer product that can store and communicate executable instructions for the implementation of various steps of the methods disclosed herein. The computer readable memory can be any computer data storage device or assembly of such devices, including random-access memories (RAMs); dynamic RAMs; read-only memories (ROMs); magnetic storage devices, such as hard disk drives, solid state drives, floppy disks, and magnetic tapes; optical storage devices, such as compact discs (e.g., CDs and CD-ROMs), digital video discs (DVDs), and Blu-Ray™ discs; flash drive memories; and/or other non-transitory memory technologies. A plurality of such storage devices may be provided, as would be appreciated by one skilled in the art. The computer readable memory may be associated with, coupled to, or included in a computer or processor configured to execute instructions contained in a computer program stored in the computer readable memory and relating to various functions associated with the computer or processor.

Figure 4:
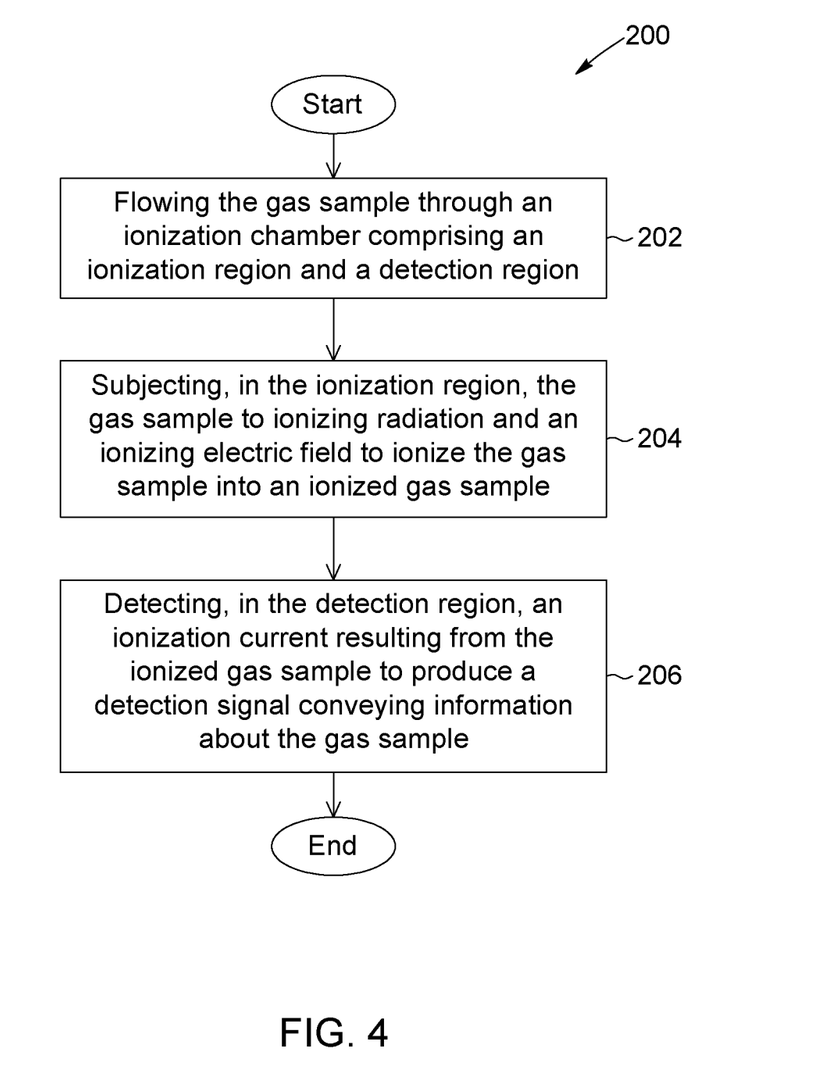
FIG. 4 is a flow diagram of an embodiment of a method of analysing a gas sample.

Referring to FIG. 4, there is provided a flow diagram of an embodiment of a method 200 of analyzing a gas sample. The method 200 may be implemented with a PID such as the one depicted in FIGS. 1 to 3, or another PID. The method 200 includes a step 202 of flowing the gas sample through an ionization chamber comprising an ionization region and a detection region. The method 200 also includes a step 204 of subjecting, in the ionization region, the gas sample to ionizing radiation (e.g., UV radiation) and an ionizing electric field to ionize the gas sample into an ionized gas sample. The method 200 also includes a step 206 of detecting, in the detection region, an ionization current resulting from the ionized gas sample to produce a detection signal conveying information about the gas sample. In some embodiments, the method can include steps of generating the ionizing radiation and supplying the ionizing radiation into the ionization region. For example, the ionizing radiation can be generated by energizing a discharge gas into a plasma and producing the ionizing radiation from the plasma. The plasma may be a dielectric barrier discharge plasma. In some embodiments, generating the ionizing radiation can include operating a pair of UV lamps arranged with respect to the ionization chamber. In some embodiments, supplying the ionizing radiation into the ionization region can include transmitting the ionizing radiation through an optical window. As noted above, the optical window can be made of a window material comprising lithium fluoride (LiF), magnesium fluoride ($MgF_2$), calcium fluoride ($CaF_2$), barium fluoride ($BaF_2$), strontium fluoride ($SrF_2$), sodium fluoride (NaF), sapphire ($Al_2O_3$), or quartz ($SiO_2$), or a combination thereof.

In some embodiments, the method 200 can include steps of providing a pair of ionization electrodes and applying an ionization drive signal to the ionization electrodes to generate the ionizing electric field in the ionization region.

In some embodiments, the step 206 of detecting the ionization current can include providing a pair of detection electrodes, biasing the detection electrodes to generate a detection electric field in the detection region to deflect ions and electrons in the ionized gas sample onto respective ones of the detection electrodes for collection by the detection electrodes, and measuring the ionization current based on the ions and electrons collected by the detection electrodes.

Of course, numerous modifications could be made to the embodiments described above without departing from the scope of the appended claims.

The invention claimed is:

1. A photoionization detector (PID) comprising:
   an ionization chamber configured to allow a flow of a gas sample therethrough, the ionization chamber defining an ionization region and a detection region;
   a photoionization source configured to generate ionizing radiation for irradiating the flow of the gas sample in the ionization region;
   an electric-field ionization source configured to apply an ionizing electric field inside the ionization chamber to intersect the flow of the gas sample in the ionization region, wherein the ionizing radiation and the ionizing electric field are configured to ionize the gas sample into an ionized gas sample; and
   an ion detector configured to detect, in the detection region, an ionization current resulting from the ionized gas sample.

2. The PID of claim 1, wherein the ionization chamber comprises a chamber body, a sample inlet configured to receive the gas sample into the chamber body, and a sample outlet configured to discharge the gas sample from the chamber body.

3. The PID of claim 1, wherein the photoionization source is configured to emit the ionizing radiation in the ultraviolet (UV) region.

4. The PID of claim 3, wherein the photoionization source is configured to emit the ionizing radiation in a wavelength range from about 150 nm down to about 100 nm.

5. The PID of claim 3, wherein the photoionization source comprises a UV lamp comprising:
a lamp body enclosing a discharge region configured to receive a discharge gas therein;
a lamp power supply configured to energize the discharge gas inside the discharge region into a plasma from which the ionizing radiation is generated; and
an optical window mounted to the lamp body and configured to allow at least part of the ionizing radiation generated inside the discharge region to pass therethrough and into the ionization chamber.

6. The PID of claim 5, wherein the UV lamp is configured to operate based on a dielectric-barrier-discharge-based excitation method.

7. The PID of claim 6, wherein the UV lamp comprises:
a pair of discharge electrodes disposed in a spaced-apart relationship on opposite sides of the lamp body to define a discharge gap in the discharge region; and
a pair of dielectric barriers disposed in the discharge gap, each dielectric barrier extending along and adjacent to a respective one of the discharge electrodes, wherein the lamp power supply is configured to energize the discharge gas into the plasma by applying a discharge drive signal to the discharge electrodes to create a discharge electric field across the discharge gap.

8. The PID of claim 7, wherein the lamp body comprises a pair of opposite sidewalls that provide the pair of dielectric barriers.

9. The PID of claim 5, wherein the flow of the gas sample, the ionizing electric field, and a surface normal to the optical window are mutually perpendicular to one another.

10. The PID of claim 5, wherein the UV lamp comprises a discharge gas inlet configured to receive the discharge gas into the discharge region and a discharge gas outlet configured to discharge the discharge gas from the discharge region.

11. The PID of claim 10, wherein the discharge gas inlet and the discharge gas outlet are configured for connection to a gas circulation system configured to circulate a flow of the discharge gas through the discharge region, from the discharge gas inlet to the discharge gas outlet.

12. The PID of claim 5, wherein the discharge gas comprises argon (Ar), xenon (Xe), krypton (Kr), neon (Ne), helium (He), hydrogen ($H_2$), oxygen ($O_2$), or nitrogen ($N_2$), or a combination thereof.

13. The PID of claim 5, wherein the UV lamp comprises a pair of UV lamps disposed on opposite sides of the ionization chamber.

14. The PID of claim 5, wherein the optical window is made of a window material comprising lithium fluoride (LiF), magnesium fluoride ($MgF_2$), calcium fluoride ($CaF_2$), barium fluoride ($BaF_2$), strontium fluoride ($SrF_2$), sodium fluoride (NaF), sapphire ($Al_2O_3$), or quartz ($SiO_2$), or a combination thereof.

15. The PID of claim 1, further comprising an optical window configured to allow at least part of the ionizing radiation to pass therethrough prior to entering the ionization region.

16. The PID of claim 15, wherein the optical window is made of a window material comprising lithium fluoride (LiF), magnesium fluoride ($MgF_2$), calcium fluoride ($CaF_2$), barium fluoride ($BaF_2$), strontium fluoride ($SrF_2$), sodium fluoride (NaF), sapphire ($Al_2O_3$), or quartz ($SiO_2$), or a combination thereof.

17. The PID of claim 1, wherein the electric-field ionization source comprises:
a pair of ionization electrodes arranged with respect to the ionization region; and
an ionization power supply configured to apply an ionization drive signal to the ionization electrodes to generate the ionizing electric field in the ionization region.

18. The PID of claim 17, wherein the ionization power supply is configured to generate the ionization drive signal as a direct current (DC) signal.

19. The PID of claim 17, wherein the ionization power supply is configured to control a magnitude of the ionizing electric field to increase an upper limit of a range of ionization energies of detectable analytes in the gas sample by an amount ranging from about 1 eV to about 4 eV.

20. The PID of claim 1, wherein the ion detector comprises:
a pair of detection electrodes arranged with respect to the detection region;
a detection power supply configured to apply a voltage between the detection electrodes to generate a detection electric field in the detection region, wherein the detection electric field is configured to deflect ions and electrons in the ionized gas sample onto respective ones of the detection electrodes for collection by the detection electrodes; and
a detection circuit configured to measure the ionization current based on the ions and electrons collected by the detection electrodes.

21. The PID of claim 1, further comprising a control and processing unit configured to:
receive, from the ion detector, a detection signal representative of the ionization current; and
determine, from the detection signal, analyte information about an analyte in the gas sample.

22. The PID of claim 21, wherein the analyte information comprises a presence or absence of the analyte in the gas sample, or an amount of the analyte in the gas sample.

23. A PID comprising:
an ionization chamber configured to receive a gas sample, the ionization chamber defining an ionization region and a detection region;
a UV radiation source configured to generate UV radiation, the UV radiation source comprising an optical window configured to transmit at least part of the UV radiation into the ionization chamber to irradiate the gas sample in the ionization region, wherein the optical window is made of a window material comprising sapphire ($Al_2O_3$);
an electric-field ionization source configured to apply an ionizing electric field to the gas sample in the ionization region, wherein the ionizing electric field is configured to combine with the transmitted UV radiation to ionize the gas sample into an ionized gas sample; and
an ion detector configured to detect, in the detection region, an ionization current resulting from the ionized gas sample.

24. The PID of claim 23, wherein the optical window is configured to substantially prevent transmission of UV photons having photon energies greater than about 8.5 eV, and wherein the transmitted UV radiation and the ionizing electric field are configured to ionize an analyte in the gas sample having an ionization energy greater than about 10 eV.

25. The PID of claim 23, wherein UV radiation source is configured to produce a dielectric barrier discharge plasma and generate the UV radiation from the dielectric barrier discharge plasma.

26. The PID of claim 23, wherein the electric-field ionization source comprises:
a pair of ionization electrodes disposed in a spaced-apart relationship on opposite sides outside of the ionization chamber; and
an ionization power supply configured to apply an ionization drive signal to the ionization electrodes to generate the ionizing electric field in the ionization region.

27. A method of analyzing a gas sample, comprising:
flowing the gas sample through an ionization chamber comprising an ionization region and a detection region;
subjecting, in the ionization region, the gas sample to ionizing radiation and an ionizing electric field to ionize the gas sample into an ionized gas sample; and
detecting, in the detection region, an ionization current resulting from the ionized gas sample to produce a detection signal conveying information about the gas sample.

28. The method of claim 27, wherein the ionizing radiation comprises UV radiation.

29. The method of claim 27, further comprising:
generating the ionizing radiation; and
supplying the ionizing radiation into the ionization region.

30. The method of claim 29, wherein generating the ionizing radiation comprises:
energizing a discharge gas into a plasma; and
producing the ionizing radiation from the plasma.

31. The method of claim 30, wherein the plasma is a dielectric barrier discharge plasma.

32. The method of claim 29, wherein generating the ionizing radiation comprises operating a pair of UV lamps arranged with respect to the ionization chamber.

33. The method of claim 29, wherein supplying the ionizing radiation into the ionization region comprises transmitting the ionizing radiation through an optical window.

34. The method of claim 33, wherein the optical window is made of a window material comprising lithium fluoride (LiF), magnesium fluoride ($MgF_2$), calcium fluoride ($CaF_2$), barium fluoride ($BaF_2$), strontium fluoride ($SrF_2$), sodium fluoride (NaF), sapphire ($Al_2O_3$), or quartz ($SiO_2$), or a combination thereof.

35. The method of claim 27, further comprising:
providing a pair of ionization electrodes; and
applying an ionization drive signal to the ionization electrodes to generate the ionizing electric field in the ionization region.

36. The method of claim 27, wherein detecting the ionization current comprises:
providing a pair of detection electrodes;
biasing the detection electrodes to generate a detection electric field in the detection region to deflect ions and electrons in the ionized gas sample onto respective ones of the detection electrodes for collection by the detection electrodes; and
measuring the ionization current based on the ions and electrons collected by the detection electrodes.

* * * * *